United States Patent

Yeh et al.

[11] Patent Number: 6,130,761
[45] Date of Patent: Oct. 10, 2000

[54] IMAGE SCANNING METHOD

[75] Inventors: Pao-Yuan Yeh; Yu-Ting Wu, both of Taipei, Taiwan

[73] Assignee: Primax Electronics Ltd., Taipei Hsien, Taiwan

[21] Appl. No.: 09/073,512

[22] Filed: May 6, 1998

[51] Int. Cl.[7] ................................................ H04N 1/04
[52] U.S. Cl. ........................ 358/474; 358/409; 358/408
[58] Field of Search ................................. 358/474, 408, 358/318, 319, 312; 382/408, 574, 581, 443

[56] References Cited

U.S. PATENT DOCUMENTS 4,574,291   3/1986   Wimmer ..................................... 348/75
4,622,596  11/1986   Suga et al. ............................... 358/335

*Primary Examiner*—Jerome Grant, II
*Assistant Examiner*—Negussie Worku
*Attorney, Agent, or Firm*—Thomas, Kayden, Horstemeyer & Risley

[57] ABSTRACT

An image scanning method for a scanner that can simultaneously sense image signals corresponding to the three primary colors or a monochromic color, and store the signals in a storage device within one exposition process. The scanning method can further determine a period of the driving signal and a number of rotation steps for the driving motor to calculate the period of the triggering signal for a light-sensitive device. The scanning method according to the invention can therefore reduce the time needed for a scanning process and improve efficiency. Furthermore, the signal-to-noise ratio of a CCD module can be improved, and the requirement for the brightness of the light source is lowered as well.

13 Claims, 2 Drawing Sheets

IMAGE SCANNING METHOD

CROSS-REFERENCE TO RELATED APPLICATION

This application claims the priority benefit of Taiwan application serial no. 87104240, filed Mar. 21, 1998, the full disclosure of which is incorporated herein by reference.

BACKGROUND OF THE INVENTION

1. Field of the Invention

This invention relates to an image scanning method for a scanner. More particularly, this invention relates to an image scanning method that can improve the image scanning rate by determining the period of the driving signal and the number of rotating steps of the driving motor, and calculating the period of triggering signal for the light-sensitive devices according to a predetermined resolution.

2. Description of Related Art

In an early scanner design, the period of the triggering signal for a light-sensitive device is conventionally used as the timing pulse because the minimum period of triggering signal for the light-sensitive device is limited by the exposure time and the time needed for storing a pixel. Hence the period of the triggering signal for the driving motor is an integral multiple of the period of the triggering signal for the light-sensitive device. As a result, the scanning rate is limited as well.

In FIG. 1A, a charge coupled device (CCD) module 10 includes three CCD sensors, which are respectively used to detect and receive the three primary colors of light. The colors of light are red, green, and blue owing to different wavelengths. The sensors include a red light sensor 100, a green light sensor 110 and a blue light sensor 120. The red, green, and blue light signals received by the light sensors are then combined to duplicate the original image. It is also practical to employ a single light sensor to receive and display a monochromic image. Conventionally, a light-sensitive device receives a signal of exposition generated corresponding to an image illuminated by a light source. Then the light-sensitive device sends a triggering signal 15 to activate the red light sensor 100, the green light sensor 110 and the blue light sensor 120 simultaneously for extracting the image signals of red, green, and blue lights respectively. Normally, the signal lines 105, 115, and 125 are shorted together at one end so that the triggering signal 15 can be fed into the red light sensor 100, green light sensor 110 and the blue light sensor 120 simultaneously. These three sensors 110, 110, and 120 receive the same triggering signal 15 because the signal lines 105, 115, and 125 are connected to each other.

The signal lines 102, 112, and 122 are used to feed received image signals of the three primary colors into the converting module 130. The converting module 130 includes a number of independent analogue/digital converters and a multiplexer 140. The red image signal, green image signal and blue image signal are converted into a red digital signal, a green digital signal, and a blue digital signal by analogue/digital converters 104, 114, and 124 respectively. Then the converted red, green, and blue digital signals are fed into the multiplexer 140 through signal lines 108, 118, and 128. The multiplexer 140 picks one signal from the group consisting of red, green, and blue digital signals according to the actual application, and stores it in storage device 150 through signal line 142.

The multiplexer 140 doesn't switch between signal lines 108, 118, and 128 during the time between two triggering signals 15 in a conventional method, that is, only one corresponding converted digital signal is stored in the storage device 150 within a triggering period. In another conventional method, the multiplexer 140 is switched three times within a triggering period and a pixel period to extract three converted digital signals and store them into the storage device 150.

Generally, a CCD module 10 driven by a motor 4 is used as an example for describing a conventional scanning device. Another functional design employs a motor to drive the document scanner but not the CCD module. A user can predetermine a scanning resolution and start the scanning job according to the predetermined scanning resolution. Normally, the higher the scanning resolution, the more digital data from the three primary colors is needed, which requires a longer scanning time as well, so the processing rate of a CCD module 10 is closely related to the predetermined resolution, As a result, the rotating speed of the motor 4 is determined according to the predetermined resolution. Since the triggering signal of a light-sensitive device is used as a basic timing pulse in a conventional method, the triggering signal 15 is fed into a driver 2 as a basic driving pulse for driving the driving motor 4 to drive the CCD module 10 to scan images. The relationship between the triggering signal 15 and the driving signal is shown in FIG. 1B.

Referring to FIG. 1B, the rotation of the motor 4 is controlled by the driving signal, wherein the driving signal is related to the predetermined resolution of the scanner and the triggering signal 15. For example, for a predetermined resolution of 300 dots per inch (dpi), a corresponding triggering signal 15 has pulses 160 to 166, and the driving signal has pulses 170, 173, and 176. In other words, every three times the CCD module 10 is triggered, the motor 4 rotates one step. Since the CCD module 10 is triggered three times during the time between the rotating steps of the motor 4, and the multiplexer 140 is not switched within every triggering period, three sets of digital data are stored by using the circuit shown in FIG. 1A. The three sets of digital data correspond to the three primary colors, and each one of the digital data is stored within a triggering period. On the other hand, the multiplexer 140 can be switched three times within one triggering period when this conventional method is applied to extract the data of a pixel, that is, all digital data from the three primary colors can be stored within one triggering period. In order to keep the motor 4 rotating at a constant speed and save the space in the buffer memory, which has a limited capacity, there is no data stored within the other two triggering periods.

The following examples are used for describing a different scanning process according to different predetermined resolutions, wherein the multiplexer 140 is not switched within one triggering period.

In the case of a predetermined resolution of 200 dpi, a corresponding driving signal has pulses 180–186 (180, 182, 184, 186) to the triggering signal 15, that is, the motor 4 rotates one step after every two times the CCD module 10 is triggered as shown in FIG. 1B. By utilizing the circuit shown in FIG. 1A, there are two sets of digital data stored within the time needed for motor 4 to rotate one step.

In the case of a predetermined resolution of 100 dpi and 75 dpi, a corresponding driving signal has pulses 190–196 (100, 191, 192, 193, 194, 195, 196) to the triggering signal 15. That is to say, the motor 4 rotates one step after every time the CCD module 10 is triggered, as shown in FIG. 1B. By utilizing the circuit shown in FIG. 1A, there is one set of digital data stored within the time needed for motor 4 to rotate one step.

According to the foregoing, the triggering signal 15 has pulses 160–166 for triggering CCD module 10. Every time the CCD module 10 is triggered, there is one set of digital data selected from the digital data from the three primary colors stored. Since the digital data of the three primary colors are needed in combination in order to duplicate an image, the amount of required digital data is directly related to the predetermined resolution. The higher the resolution, the more color data are required. Generally, the data needed for displaying an image at a resolution of 300 dpi is about three times the data needed for displaying an image at a resolution of 100 dpi. Since the method for extracting colors is not related to the invention, there is no further discussion about it.

If there is only one set of data from which a color can be extracted within one triggering period, the motor 4 has to wait for at least three triggering periods for the CCD module 10 to extract three sets of digital data for the three primary colors at one position before the motor can move to the next position. Furthermore, even though the CCD module 10 only extracts one set of digital data for a monochrome image, the motor 10 still has to wait for one triggering period before it can move the CCD module 10 to the next position for extracting the next set of color data. As a result, the motor speed is limited by the frequency of the triggering signal 15.

Even though the CCD module 10 is able to extract and store three sets of digital color data within one triggering period, that is, the multiplexer 140 is switched three times within one triggering period, but the triggering signal is still used as a basic driving pulse for the motor 4, the rotation speed of motor 4 is still limited by the frequency of the triggering signal 15. Furthermore, since the other two triggering periods are not used for extracting or storing data, it wastes the system's resources.

According to the foregoing, a conventional image scanning method for a scanner has at least the following drawbacks:

1. The CCD module can only store one set of digital data for the three primary colors within one triggering period, which makes the scanning rate low and limited.
2. Because the triggering signal is used as a basic driving pulse, the frequency of the driving signal cannot exceed the frequency of the triggering signal, which limits the scanning rate.

SUMMARY OF THE INVENTION

It is therefore objective of the present invention to provide an image scanning method that can release the driving signal from the limitation of the triggering signal to improve the rotation rate of the driving motor.

It is another objective of the present invention to provide an image scanning method to let the light-sensitive device extract digital data for all the three primary colors, or any one of the three primary colors, at once within one triggering period to improve the scanning rate.

In accordance with the foregoing and other objectives of the present invention, the method according to the present invention provides an image scanning method that includes the following steps.

Firstly, a predetermined resolution is set according to an actual application to determine the frequency of the driving signal and the number of rotation steps of the motor. Furthermore, the period of the triggering signal is determined by the product of the period of the driving signal and the number of rotation steps of the driving motor.

Then, in the presence of the pulse of the triggering signal, a light-sensitive device, such as a CCD module, extracts the three primary colors at the same time. The extracted image signals are then output by the light-sensitive device in an output frequency and converted into digital signals through an analogue/digital converting process. The converted digital signals are stored in a storage device.

A frequency of the triggering signal can be obtained according to the predetermined resolution and the period of the driving signal; the needed number of rotation steps of the motor within one triggering period varies with the predetermined resolution as well. The frequency of the triggering signal $T_G$, the frequency of the driving signal $T_M$, and the number of rotation steps of the motor within one triggering period N have a following relationship.

$T_G = T_M * N$, or $T_M = T_G/N$.

Hence, the lower the resolution, the larger the number of rotation steps of the motor within one triggering period, and the faster the scanning rate.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1A:
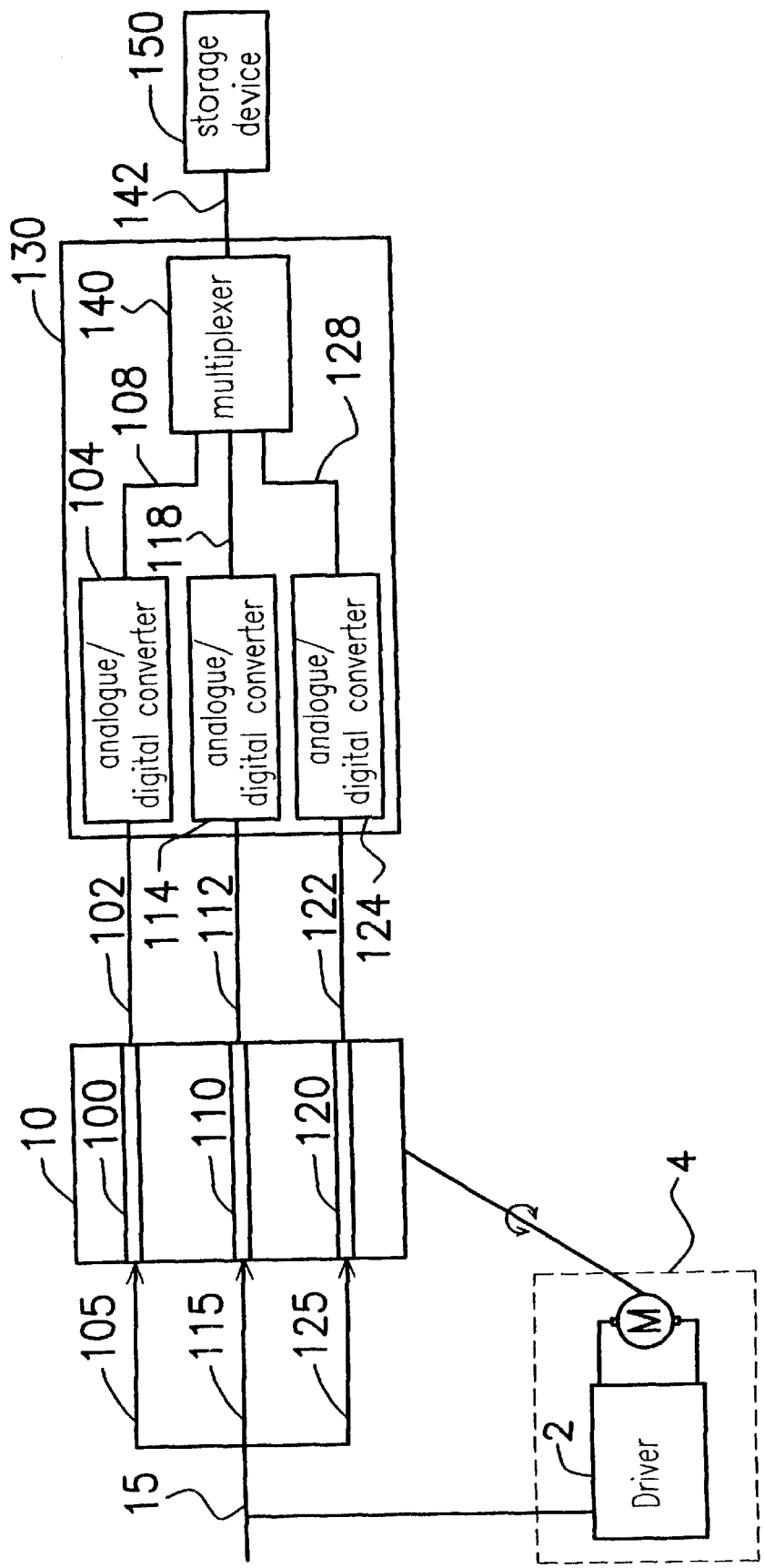
FIG. 1A is a schematic block diagram showing a conventional image scanning method of a CCD module.
Figure 1B:
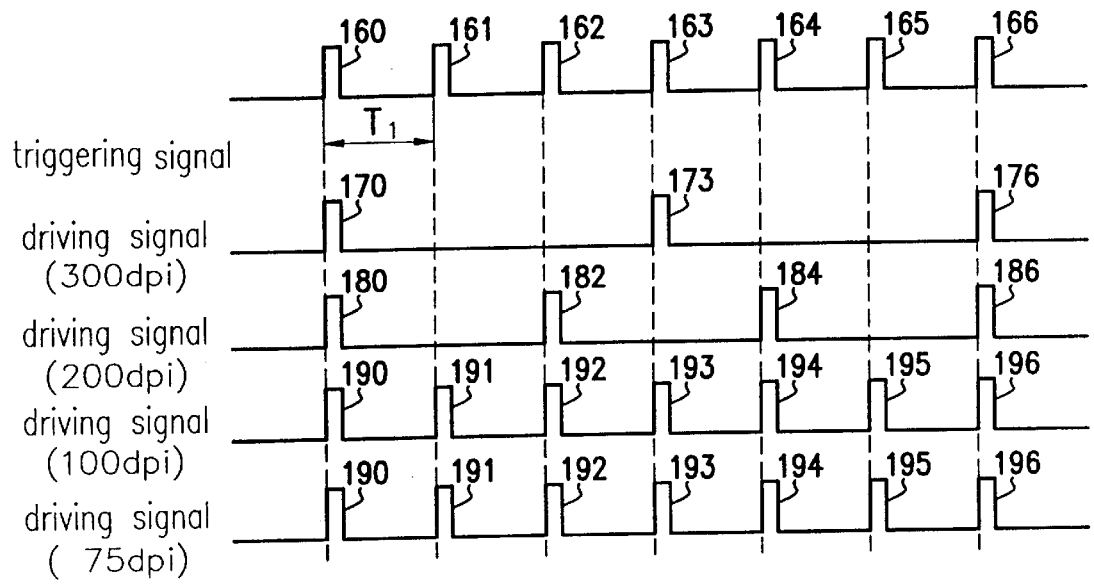
FIG. 1B is a schematic diagram showing the relationship between the triggering signal and the driving signals in a conventional image scanning method.

As in the constructed circuit shown in FIG. 1A, a CCD module is able to extract signals of the three primary colors from an exposition signal. The functions of the circuit are mostly similar to the conventional method except that the extracted digital signals of the three primary colors are fed into the multiplexer 140 through signal lines 108, 118, and 128. The multiplexer 140 can selectively store either three sets of digital signals or just one of them into a storage device 150. In the case of storing three sets of digital signals into the storage device 150, the multiplexer 140 is working with a timing signal frequency three times faster than the frequencies of the three digital signals. Thus, the multiplexer 140 is switched three times within one period of the digital signals, so that three sets of digital signals can be stored into the storage device 150. One of ordinary skills in the art can still store three sets of digital signals respectively for achieving the purpose of storing three sets of digital signals at the same time by dividing the stored signals and using the raising edge, dropping edge, and the signal voltage level.

Figure 2:
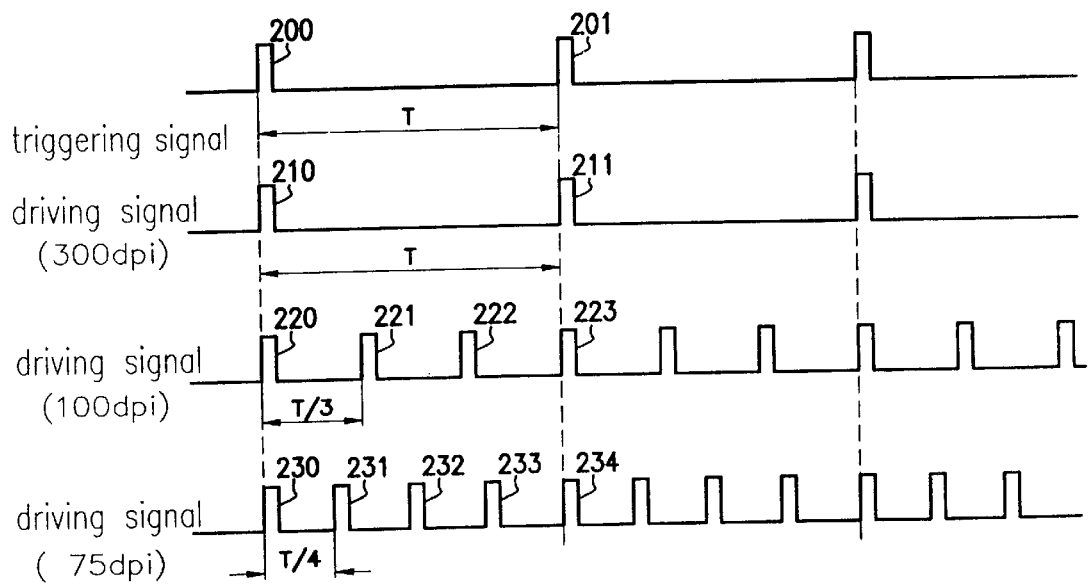
FIG. 2 is a schematic diagram showing the relationship between the triggering signal and the driving signals in the image scanning method in a preferred embodiment according to the invention.

Referring to FIG. 2, the triggering signals includes pulses 200 and 201, wherein the interval T between pulses is the period of the triggering signal. In the case of a predetermined resolution of 300 dpi, the driving signal of the driving motor in a scanner has pulses 210 and 211, wherein the pulses 210 and 211 are in phase with the triggering signals. Thus, the CCD module extracts the exposition signal once within one driving step of the driving motor. In fact, the frequency of the driving signal and the number of rotation steps of the motor are determined by a predetermined resolution, and the period of the triggering signal is determined by the product of the period of the driving signal and the number of rotation steps of the driving motor.

In the case of a resolution of 100 dpi, a driving signal of the motor includes pulses 220, 221, 222, and 223, wherein the period of the triggering signal T is three times the period of the driving signal. Thus, the CCD module extracts the exposition signal once every time the driving motor moves three steps. The resolution is one third of the resolution of 300 dpi.

In the case of a resolution of 75 dpi, a driving signal of the motor includes pulses 230, 231, 232, 233, and 234, wherein the period of the triggering signal T is four times the period of the driving signal. Thus, the CCD module extracts the exposition signal once every time the driving motor moves four steps. The resolution is one forth of the resolution of 300 dpi.

The periods of driving signals for different resolutions are related to the actual applications and designs, that is, it is not necessary that they be the same, and not necessary that they be different, either. The point of the method according to the invention is that the period of the triggering signal is no longer used as a basic timing pulse. The triggering signal and driving signal are two totally independent signals. Normally, the period of the triggering signal is an integral multiple of the period of the driving signal. In fact, since the period of the triggering signal is larger than or equal to the product of the period of the driving signal and the number of the rotation steps of the driving motor within one period of the triggering signal, the period of the driving signal is always smaller than or equal to the period of the triggering signal. As a result, the rotation rate of the driving motor is not limited by the period of the triggering signal, so that the rotation rate can be improved, especially in the cases of low resolutions. It is an important technical characteristic of the invention.

Furthermore, even though the method in this embodiment according to the invention stores three sets of signals of the three primary colors at once, one of ordinary skills in the art can still apply the same principle on a monochromic application. Such an application would not go against the spirit of the invention.

In order to make the differences between the method according to the invention and the conventional method more obvious, the differences are listed in the table below:

TABLE 1

| Resolution | 300 dpi | 100 dpi | 75 dpi |
| --- | --- | --- | --- |
| Number of needed periods of the triggering signal | 3 ms | 3 ms | 3 ms |
| Number of triggering periods | 3 | 1 | 1 |
| Rotation time | 9 ms | 3 ms | 3 ms |

TABLE 2

| Resolution | 300 dpi | 100 dpi | 75 dpi |
| --- | --- | --- | --- |
| Number of needed periods of the triggering signal | 6 ms | 6 ms | 6 ms |
| Number of triggering periods | 1 | 3 | 4 |
| Rotation time | 6 ms | 2 ms | 1.5 ms |

Table 1 is a conventional image scanning method for storing a set of color data within one period of the triggering signal at the resolutions of 300 dpi, 100 dpi, and 75 dpi. The second row represents the needed number of periods of the triggering signal, wherein the triggering signal is used to trigger the CCD module for outputting extracted image signals of the three primary colors within the needed periods of triggering signals. Since an operating time is needed by the CCD module to process the received and outputted image signals, the triggering period has to match the operating time in order to be efficient. That is to say, the triggering period cannot be shorter than the operating time or else the extracted data will be lost because of the interruption of the next triggering signal. Inversely, if the period of triggering signal is longer than the operating time, the system is in an idle state after storing data and before the next triggering signal, which will decrease the scanning rate.

The third row represents the number of triggering signals needed to drive the driving motor to rotate one step. Because the CCD module can only store one set of data at once, the CCD module needs to extract more data at one position when the resolution is getting higher, so that a higher number of triggering periods are needed.

The fourth row represents the rotation time, which is the time needed for the motor to rotate one step.

Table 2 represents the results of scanning images at the resolutions of 300 dpi, 100 dpi, and 75 dpi by a method used in a preferred embodiment according to the invention.

The second row represents the periods of the triggering signals, and is described below.

The third row represents the numbers of rotation steps of the driving motor, that is, the steps the driving motor needs to relocate the CCD module within a period of the triggering signal at different required resolutions. As the required resolution is high, the number of steps is less because more image data are needed. For instance, at the resolution of 300 dpi, the driving motor only move the CCD module one step away from the position where the CCD module extracts signals of the three primary colors within one triggering period before the CCD module extracts another set of signals. At the resolution of 100 dpi, the driving motor only moves the CCD module three steps away from the position where the CCD module extracts signals from the three primary colors within one triggering period before the CCD module extracts another set of signals. And at the resolution of 75 dpi, the driving motor only moves the CCD module four steps away from the position where the CCD module extracts signals of the three primary colors within one triggering period before the CCD module extracts another set of signals. As a result, the scanning rate is faster while the required resolution is lower. In practice, the required resolutions and the corresponding numbers of rotation steps of the driving motor are listed in a table such as Table 2 for checking the needed number of rotation steps of the driving motor before a scanning process.

In the foregoing description, the image scanning method according to the invention simultaneously stores three sets of image data in one exposition process by using a multiplexer 140 to store three sets of data in sequence or just one set of monochromic data. Because a CCD module with a shorter operating time is more expensive, the period of the triggering signal has a minimum in reality due to the consideration of manufacturing cost. However, theoretically, the period of the triggering signal can be reduced proportionally according to a predetermined resolution.

The fourth row represents the time needed for the driving motor to move the CCD module one step away, that is, the period of the driving signal. The lower the resolution, the shorter the rotation time, and the faster the scanning rate.

According to the foregoing, since the driving signal for the driving motor is dependent on the triggering signal, the rotation time of the driving motor cannot be shorter than the period of the triggering signal. The period of the driving signal of the driving motor in the invention is found by dividing the period of the triggering signal according to the required resolution, so it is always shorter than the period of the triggering signal, and the rotation time needed for the driving motor can be reduced, especially in the case of low resolutions. Furthermore, the invention has a longer triggering period, so the signal-to-noise ratio increases, and the requirement on the brightness of light source decreases as well.

According to the foregoing, the invention includes at least the following advantages:

1. Three sets of image data are stored within one triggering period for improving the scanning rate;
2. The driving signal is not limited by the triggering period, so that the rotation rate of the motor can be improved, especially in the cases of low resolutions; and
3. The invention has a longer triggering period, so that the signal-to-noise ratio is increased, and the requirement on the brightness of the light source is decreased as well.

Even though a CCD module is used in the foregoing embodiment according to the invention, one of ordinary skill in the art can understand that a light-sensitive device of any kind can be used in place of the CCD module.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An image scanning method for a scanner, the method comprising the steps of:

determining a driving signal, a triggering signal, and a number of rotation steps according to a predetermined resolution, wherein a period $T_G$ of the triggering signal equals a period $T_M$ of the driving signal multiplied by the number of rotation steps N within the period $T_G$;

driving a motor by the driving signal;

outputting an image signal by the triggering signal; and storing the image signal within the period of the triggering signal.

2. The method of claim 1, wherein the period of the driving signal is obtained by checking a table referring to the predetermined resolution.

3. The method of claim 1, wherein the number of rotation steps is obtained by checking a table referring to the predetermined resolution.

4. The method of claim 1, wherein the period of the driving signal is obtained by checking a table referring to the predetermined resolution.

5. The method of claim 1, wherein the step of storing the image signal further comprises the steps of:

converting the image signal into a digital signal; and storing the digital signal within the period of the triggering signal.

6. An image scanning method comprising the steps of:

obtaining a number of rotation steps for a motor and a period of a driving signal by checking a table and referring to a predetermined resolution, and obtaining a period of a triggering signal by means of the period of the driving signal and the number of rotation steps for the motor, wherein the period $T_G$ of the triggering signal equals the period of the driving signal $T_M$ multiplied by the number of rotation steps for the motor N within the period $T_G$;

driving the motor by means of the driving signal;

outputting a first image signal, a second image signal, and a third image signal by means of the triggering signal; and storing the first image signal, the second image signal, and the third image signal within the period of the triggering signal.

7. The method of claim 6, wherein the step of storing the first image signal, the second image signal, and the third image signal further comprises:

converting the first image signal into a first digital signal;

converting the second image signal into a second digital signal;

converting the third image signal into a third digital signal; and storing the first image signal, the second image signal, and the third image signal within the period of the triggering signal.

8. An image scanning method comprising the steps of:

obtaining a number of rotation steps for a motor and a period of a triggering signal by checking a table and referring to a predetermined resolution, and obtaining a period of a driving signal by means of the period of the triggering signal and the number of rotation steps for the motor, wherein the period of the driving signal $T_M$ equals the period $T_G$ of the triggering signal divided by the number of rotation steps for the motor N within the period $T_G$;

driving the motor by the driving signal;

outputting a first image signal, a second image signal, and a third image signal of the triggering signal; and storing the first image signal, the second image signal, and the third image signal within the period of the triggering signal.

9. The method of claim 8, wherein the step of storing the first image signal, the second image signal, and the third image signal further comprises:

converting the first image signal into a first digital signal;

converting the second image signal into a second digital signal;

converting the third image signal into a third digital signal; and storing the first image signal, the second image signal, and the third image signal within the period of the triggering signal.

10. An image scanning method comprising:

obtaining a number of rotation steps for a motor and a period of a driving signal by checking a table and referring to a predetermined resolution, and obtaining a period of a triggering signal by means of the period of the driving signal and the number of rotation steps for the motor, wherein the period $T_G$ of the triggering signal equals the period of the driving signal $T_M$ multiplied by the number of rotation steps for the motor N within the period $T_G$;

driving the motor by means of the driving signal;

outputting a first image signal, a second image signal, and a third image signal by means of the triggering signal; and storing one of the first image signal, the second image signal, or the third image signal within the period of the triggering signal.

11. The method of claim 10, wherein the step of storing the first image signal, the second image signal, and the third image signal further comprises:

converting the first image signal into a first digital signal;

converting the second image signal into a second digital signal;

converting the third image signal into a third digital signal; and storing one of the first image signal, the second image signal, or the third image signal within the period of the triggering signal.

12. An image scanning method comprising:

obtaining a number of rotation steps for a motor and a period of a triggering signal by checking a table and referring to a predetermined resolution, and obtaining a period of a driving signal by means of the period of the triggering signal and the number of rotation steps for the motor, wherein the period of the driving signal $T_M$ equals the period $T_G$ of the triggering signal divided by the number of rotation steps for the motor N within the period $T_G$;

driving the motor by means of the driving signal;

outputting a first image signal, a second image signal, and a third image signal by means of the triggering signal; and storing one of the first image signal, the second image signal, or the third image signal within the period of the triggering signal.

13. The method of claim 12, wherein the step of storing the first image signal, the second image signal, and the third image signal further comprises:

converting the first image signal into a first digital signal;

converting the second image signal into a second digital signal;

converting the third image signal into a third digital signal; and storing one of the first image signal, the second image signal, or the third image signal within the period of the triggering signal.

* * * * *

UNITED STATES PATENT AND TRADEMARK OFFICE
CERTIFICATE OF CORRECTION

Page 1 of 1

PATENT NO.       : 6,130,761
APPLICATION NO.  : 09/073512
DATED            : October 10, 2000
INVENTOR(S)      : Pao-Yuan Yeh and Yu-Ting Wu It is certified that error appears in the above-identified patent and that said Letters Patent is hereby corrected as shown below:

On the Title Page, please insert:

Item --[30]    Foreign Application Priority Data
    March 21, 1998    [TW]    Taiwan..........................87104240--

Signed and Sealed this
Twelfth Day of July, 2011

David J. Kappos
*Director of the United States Patent and Trademark Office*